United States Patent [19]

Momoyama

[11] 4,398,516
[45] Aug. 16, 1983

[54] IGNITION TIMING CONTROL SYSTEM FOR INTERNAL COMBUSTION ENGINE

[75] Inventor: Tsutomu Momoyama, Himeji, Japan

[73] Assignee: Mitsubishi Denki Kabushiki Kaisha, Tokyo, Japan

[21] Appl. No.: 239,206

[22] Filed: Mar. 3, 1981

[30] Foreign Application Priority Data

Mar. 3, 1980 [JP] Japan .................................. 55-27060
Mar. 3, 1980 [JP] Japan .................................. 55-27061
Apr. 9, 1980 [JP] Japan .................................. 55-47723
Apr. 9, 1980 [JP] Japan .................................. 55-47724

[51] Int. Cl.$^3$ ............................. F02P 5/08; F02P 5/04
[52] U.S. Cl. .................................. 123/418; 123/414; 123/416
[58] Field of Search ............... 123/418, 414, 416, 427, 123/406

[56] References Cited

U.S. PATENT DOCUMENTS

| | | | |
|---|---|---|---|
| 4,066,968 | 1/1978 | Guipaud | 123/418 |
| 4,127,092 | 11/1978 | Fresow et al. | 123/418 |
| 4,252,095 | 2/1981 | Jaulmes | 123/418 |
| 4,276,860 | 7/1981 | Capurka | 123/418 |
| 4,284,046 | 8/1981 | Hashimoto et al. | 123/418 |
| 4,292,942 | 10/1981 | Katada et al. | 123/418 |
| 4,292,943 | 10/1981 | Kyogoku et al. | 123/418 |
| 4,296,471 | 10/1981 | Goux | 123/418 |
| 4,334,509 | 6/1982 | Nash | 123/418 |
| 4,335,692 | 6/1982 | Miura | 123/418 |

Primary Examiner—Raymond A. Nelli
Attorney, Agent, or Firm—Oblon, Fisher, Spivak, McClelland & Maier

[57] ABSTRACT

Herein disclosed is an ignition timing control system for an internal combustion engine, wherein an angular signal generated at a predetermined crank position is used so that the ratio of the angle, at which such a discharge output of the triangular wave of an integrator made operative to repeat its charging and discharging operations in a constant current as intervenes between each of the adjacent crank positions reaches a first predetermined value, is made constant relative to said angular signal thereby to preset a constant angle ($\alpha$) and so that the time period, for which such a charge output of the triangular wave of said integrator as intervenes between each of the adjacent crank positions reaches a second predetermined value, is made constant relative to said angular signal thereby to preset a constant time period (t), whereby the timing, at which said charge output reaches the second predetermined value, is retarded because of said constant time period in accordance with the rise in the r.p.m. of said internal combustion engine so that the generation timing of a trigger output is retarded in accordance with the rise of the r.p.m. of said engine thereby to attain angle retardation characteristics having a constant gradient.

8 Claims, 22 Drawing Figures

F I G. 3
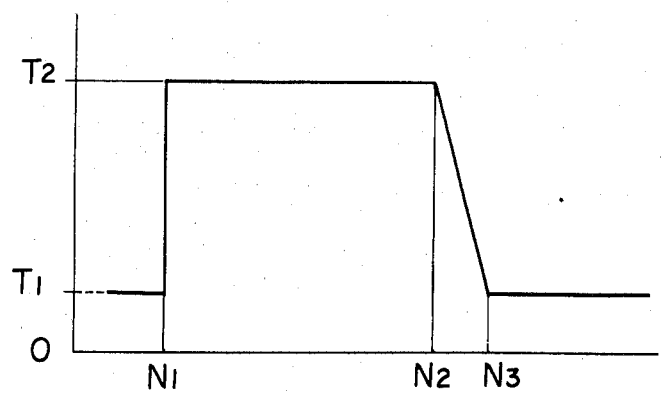
F I G. 4
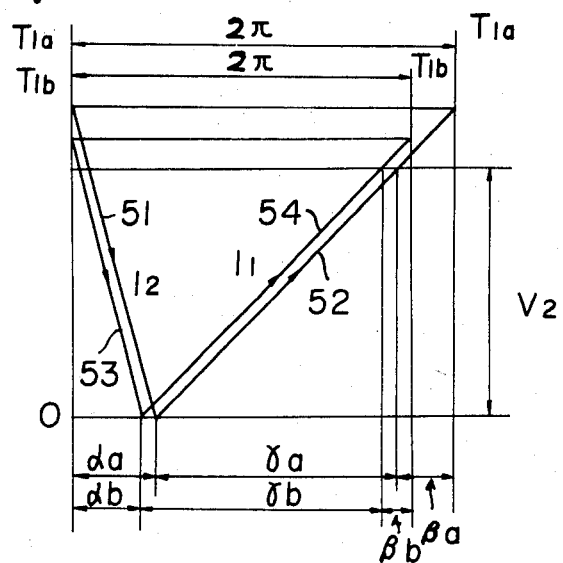
F I G. 5
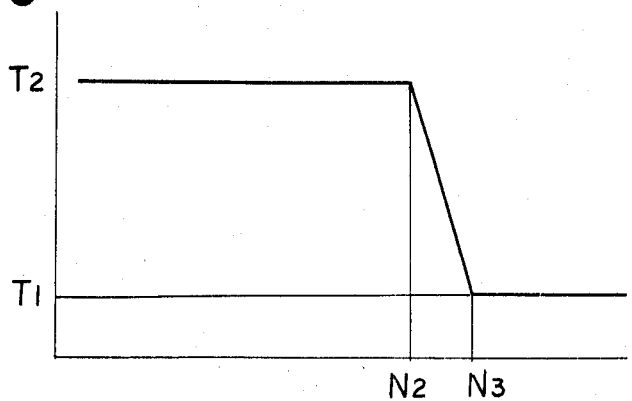

IGNITION TIMING CONTROL SYSTEM FOR INTERNAL COMBUSTION ENGINE

BACKGROUND OF THE INVENTION

1. Field of the Invention

The present invention relates to an ignition timing control system for controlling the ignition timing of an internal combustion engine in accordance with the various parameters of the engine such as the r.p.m. of the engine.

2. Description of the Prior Art

In the system of that kind according to the prior art, the trigger level of the signal voltage of a signal generator, which is generated in synchronism with the r.p.m. of the engine in a manner to correspond to the ignition timing, is detected so that the semiconductor switching element of an ignition device is turned on and off to generate a sparking voltage at the secondary side of an ignition coil, whereby the ignition timing of the engine is determined in accordance with the waveform of said signal voltage. In this way, therefore, the ignition timing is determined in accordance with the waveform of the signal voltage so that it fails to sufficiently meet the requirement of the engine.

SUMMARY OF THE INVENTION

It is, therefore, an object of the present invention to provide an improve ignition timing control system for an internal combustion engine, wherein a first angular signal to be generated at a first crank position and a second angular signal to be generated at a second crank position which is retarded from the first-named crank position are used to determine the maximum advance timing and the maximum retardation timing from the first- and second-named angular signals, respectively, so that the ratio of the angle, at which such a discharge output of the triangular wave of an integrator made operative to repeat its charging and discharging operations in a constant current as intervenes between the second-named crank positions reaches a first predetermined value from the second-named crank position, is made constant relative to the second-named angular signal thereby to preset a constant angle ($\alpha$) and so that the time period, for which such a charge output of the triangular wave of said integrator as intervenes between the second-named crank positions reaches a second predetermined value, is made contant relative to the second-named angular signal thereby to preset a constant time period ($t$), whereby the timing, at which said charge output reaches the second predetermined value, is retarded because of said constant time period ($t$) in accordance with the rise in the r.p.m. of the engine so that the ignition timing, which is angularly retarded with a constant gradient from the first-named crank position to the second-named crank position in accordance with the rise in the r.p.m. of the engine, can be attained.

Another object of the present invention is to provide an improved ignition timing control system for an internal combustion engine, wherein an angular signal to be generated at a predetermined crank position is used so that the ratio of the angle, at which such a discharge output of the triangular wave of an integrator made operative to repeat its charging and discharging operations in a constant current as intervenes between each of the adjacent crank positions reaches a first predetermined value, is made constant relative to said angular signal thereby to preset a constant angle ($\alpha$) and so that the time period, for which such a charge output of the triangular wave of said integrator as intervenes between each of the adjacent crank positions reaches a second predetermined value, is made constant relative to said angular signal thereby to preset a constant time period ($t$) whereby the timing, at which said charge output reaches the second predetermined value, is retarded because of said constant time period in accordance with the r.p.m. of the engine so that the generation timing of a trigger output is retarded in accordance with the rise in the r.p.m. of the engine thereby to attain ignition retardation characteristics having a constant gradient.

Still another object of the present invention is to provide an improve ignition timing control system for an internal combustion engine, wherein either an angular signal to be generated at a predetermined crank position or a trigger output having its generation timing retarded in accordance with the rise in the r.p.m. of the engine is used as a signal for determining the ignition timing so that angular retardation characteristics and constant ignition timing characteristics subsequent to those angular retardation characteristics are attained.

A further object of the present invention is to provide an improved ignition timing control system for an internal combustion engine, wherein a first angular signal to be generated at a first predetermined crank position and a second angular signal to be generated at a second crank position different from the first-named crank position are used to attain angular retardation characteristics having their generation timings retarded and constant ignition timing characteristics from the first- and second-named angular signals, respectively, whereby the angular retardation characteristics and the constant ignition timing characteristics can be preset independently of each other so that the degree of freedom of presetting the ignition timing characteristics required by the engine can be remarkably improved.

A further object of the present invention is to provide an improved ignition timing control system for an internal combustion engine, wherein an angular signal to be generated at a predetermined crank position is used so that the ratio of the angle, at which such a charge output of the triangular wave of an integrator made operative to repeat its charging and discharging operations in a constant current as intervenes between each of the adjacent crank positions reaches a first predetermined value, is made constant relative to said angular signal thereby to preset a constant angle ($\alpha$) and so that the time period, for which such a discharge output of the triangular wave of said integrator as intervenes between each of the adjacent crank positions reaches a second predetermined value, is made constant relative to said angular signal thereby to preset a constant time period ($t$), whereby the timing, at which the discharge output reaches the second predetermined value, is retarded because of said constant time period in accordance with the rise in the r.p.m. of the engine so that the generation timing of a trigger output is retarded in accordance with the rise in the r.p.m. of the engine thereby to attain angular retardation characteristics having a constant gradient.

A further object of the present invention is to provide an improved ignition timing control system for an internal combustion engine, wherein an integrator made operative to repeat its charging and discharging operations in a constant current is made to generate charge and discharge voltages of triangular waves relative to an angular signal to be generated at a predetermined crank position of the engine such that it is reversed to its charging operation when said discharge voltage reaches a first reference value, whereby the ratio in the discharge voltage between a crank position and a subsequent crank position becomes constant even for the change in the r.p.m. of the engine because of said constant current thereby to generate an ignition signal at a position in which said discharge voltage reaches the first reference value, thus attaining the ignition timing characteristics, in which the generation position of said ignition signal is angular retarded with a constant gradient because the discharge time period of said discharge voltage is constant within the r.p.m. range until the r.p.m. of the engine reaches a predetermined value so that the timing, at which said discharge voltage reaches the first reference value, is retarded in accordance with the rise in the r.p.m. of the engine.

BRIEF DESCRIPTION OF THE DRAWINGS

FIG. 3 is a characteristic curve of the ignition timing attained by the circuit of FIG. 1;

FIG. 4 is a waveform chart for illustrating the angularly retarding operations;

FIG. 5 is a characteristic curve showing another ignition timing;

DESCRIPTION OF THE PREFERRED EMBODIMENTS

An excellent embodiment of an ignition timing control system for an internal combustion engine will be described in the following with reference to FIG. 1.

Figure 1:
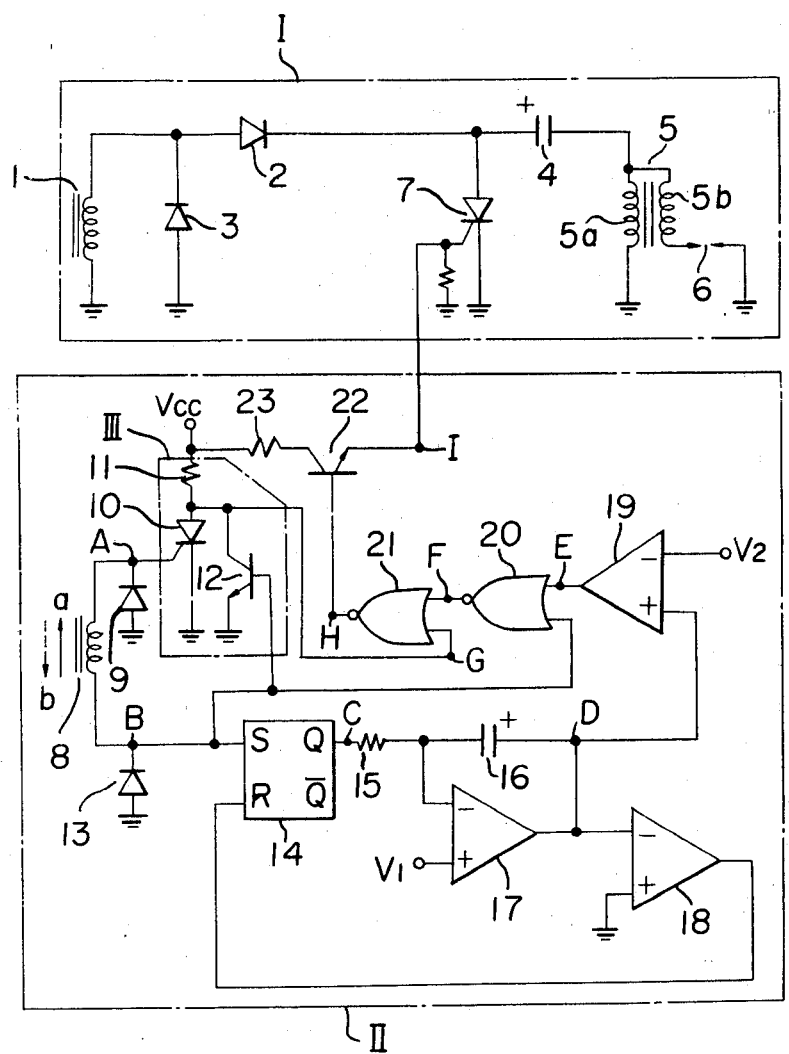
FIG. 1 is an electric circuit diagram showing one example of the present invention.

In FIG. 1, reference numeral I generally indicates an ignition device, which is constructed as a well known CD ignition device in the present embodiment, as follows. Specifically, reference numeral 1 indicates the generating coil of a not-shown magnetic generator for generating positively and negatively alternating voltages in synchronism with the revolutions of the engine. Indicated at numerals 2 and 3 are diodes which are operative to rectify the output of that generating coil 1. Indicated at numeral 4 is a condenser which is to be charged with the rectified output of that diode 2. Indicated at numeral 5 is an ignition coil which is connected with the discharge circuit of that condenser 4 and which is composed of a primary coil 5a connected in series with the condenser 4 and a secondary coil 5b connected with an ignition plug 6. Indicated at numeral 7 is a thyristor or a switching semiconductor element which is connected with the discharge circuit of that condenser 4 so that the charges stored in the condenser 4 are released to the primary coil 5a upon conduction of the thyristor 7. Generally indicated at numeral II is an ignition timing control circuit which is constructed in the following manner, featuring the present invention. Specifically, numeral 8 indicates a signal coil, i.e., an angular position detector, which is mounted in the aforementioned magnetic generator together with the generating coil 1 so that it generates positive and negative angular signals in synchronism with the revolutions of the engine. Of these, a first angular signal (a) corresponds to a predetermined crank position of that engine, i.e., the maximum angular advance position ($T_2$) required by the engine, whereas a second angular position (b) corresponds to such a crank position as is retarded a predetermined angle from the generation position of the first angular signal (a), i.e., the maximum angular retardation position ($T_1$) required by the engine. Indicated at numeral 9 and 13 are diodes which are operative to rectify the full waves of the positive and negative angular signals and to separate them into the first and second angular signals (a) and (b). Generally indicated at numeral III is a kind of flip-flop circuit (which will be shortly referred to as a first F.F. circuit), which is constructed of a thyristor 10, a register 11 and a transistor 12 such that the thyristor 10 has its gate connected with the A terminal of the signal coil 8 and such that the transistor 12 has its base connected with the B terminal of the signal coil 8. Numerals 14, 15, 16 and 17 indicate a flip-flop circuit (which will be shortly referred to as a second F.F. circuit), a resistor, a condenser and an operational amplifier (which will be shortly referred to as an ope-amp.), respectively, such that the resistor 15 and the condenser 16 constitute an integrator. Numerals 18 and 19 indicate voltage comparators (which will be shortly referred to as comparators), whereas numerals 20 and 21 indicate NOR gates. The second F.F. circuit 14 has its set terminal (S) connected with the B terminal of the signal coil 8 and its output terminal (Q) connected through the resistor 15 with the reversed input terminal (which will be referred to as a ($-$) terminal) of the ope-amp. 17. The output terminal of this ope-amp 17 is connected with not only the ($-$) terminal of the comparator 18 but also the ($-$) terminal of itself. On the other hand, the non-reversed input terminal (which will be referred to as a (+) terminal) of the ope-amp 17 is biased to a comparison voltage (V₁) whereas the (+) terminal of the comparator 18 is grounded to the earth. On the other hand, the output terminal of the comparator 18 is connected with the reset terminal (R) of the second F.F. circuit 14. The other comparator 19 has its (+) terminal connected with the output terminal of the ope-amp 17 and its (−) terminal biased to a reference voltage (V₂). Both the output terminal of the comparator 19 and the (B) terminal of the signal coil 8 are connected with the respective input terminals of the NOR gate 20. Both the output terminal of that NOR gate 20 and the output terminal of the first F.F. circuit III, which is constructed of the thyristor 10, the resistor 11 and the transistor 12, are connected with the respective input terminals of the other NOR gate 21, the output terminal of which is connected with the base of a transistor 22. This transistor 22 has its collector connected with a power source terminal (Vcc) through a resistor 23 and its emitter connected with the gate of the thyristor 7 of the ignition device I.

Figure 2:
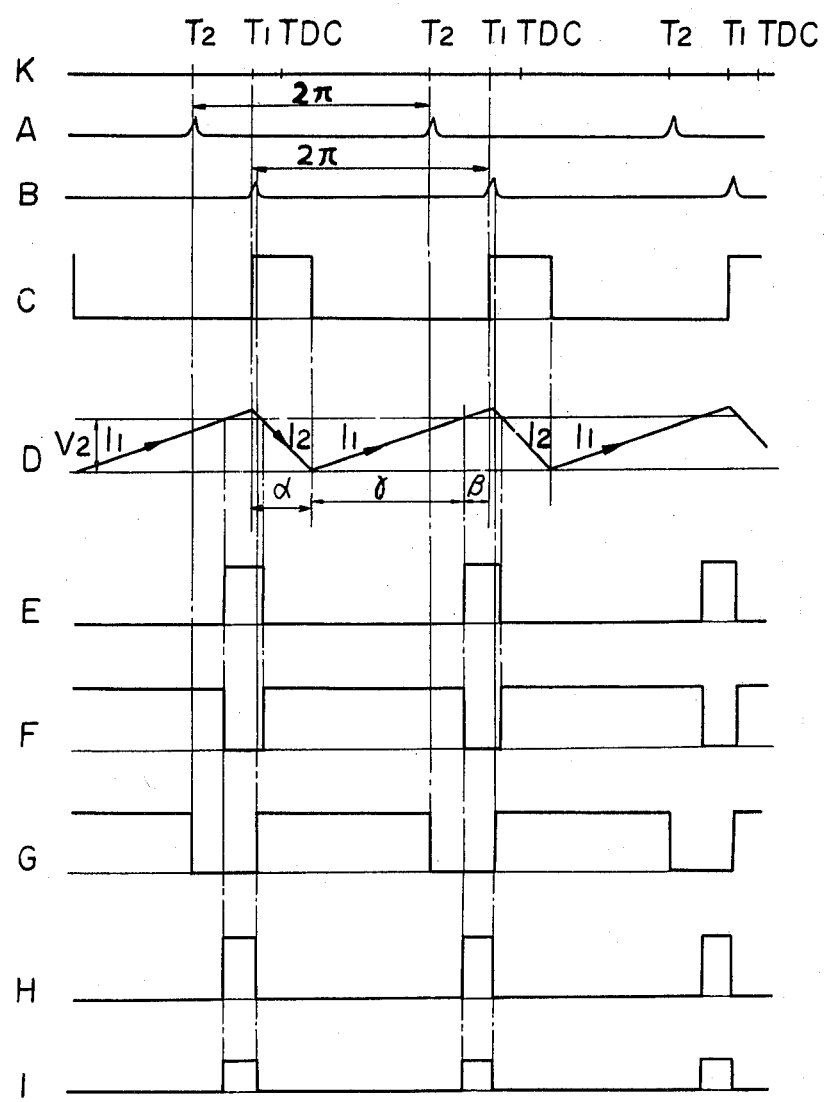
FIG. 2 is a waveform chart illustrating the operations of the embodiment of FIG. 1.
Figure 6:
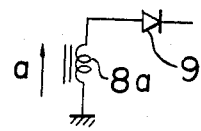
FIG. 6 is a circuit diagram showing the essential portions of other embodiments of signal coils for generating first and second angular signals (a) and (b)
Figure 6:
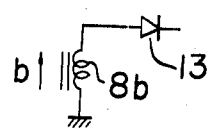

The operations of the embodiment having the construction thus far described will be described in detail with reference to the operation chart shown in FIG. 2. Indicated at letters (K), (TDC), (T₁) and (T₂) in FIG. 2 are the crank position of the engine, the top dead center of the engine, the position of the maximum angular retardation of the engine, at which the second angular signal (b) is generated, and the position of the maximum angular advance of the engine, at which the first angular signal (a) is generated. Numerals (A) to (I) indicate the voltage and pulse waveforms of the respective portions shown in FIG. 1.

Let it be assumed here that the engine requires the ignition timing characteristics shown in FIG. 3.

First of all, the operations in case the engine is revolving at a constant speed with such an r.p.m. as is larger than (N₂) but smaller than (N₃), as shown in FIG. 3. In a manner to correspond to the crank positions (T₁) and (T₂), the signal coil 8 generates such first and second angular signals once each revolution of the engine as have their angular widthes narrowed and steeply varied. If the set terminal (S) of the second F.F. circuit 14 is fed with the second one (b) of those signals, the output terminal (Q) of the same takes a high level. As a result, the charges stored in advance with the shown polarity in that condenser 16 are released in such a current (I₂) as will be expressed by the following Equation:

$$I_2 = \frac{\text{High Level Voltage of 2nd F.F. CKT 14} - \text{Comparison Voltage (V}_1\text{)}}{\text{Resistance of Resistor 15}}.$$

As is expressed in the above Equation, that discharge current (I₂) remains constant even with the variation in the r.p.m. of the engine if the high level voltage of the second F.F. circuit 14, the resistance of the resistor 15 and the comparison voltage (V₁) are constant. When the condenser 16 is discharged in the discharge current (I₂), the output voltage (D) of the ope-amp (17) is linearly lowered with a constant gradient independently of the r.p.m., as shown at letter (D) in FIG. 2, until it takes a level lower than the potential at the (+) terminal of the comparator 18. Then, a positive pulse voltage is generated at the output of the comparator 18 and is fed to the reset terminal (R) of the second F.F. circuit 14 so that the circuit 14 is reversed to have a low level at its output terminal (Q).

When that second F.F. circuit 14 takes the low level at its output terminal (Q), the condenser 16 is again charged in the shown polarity with such a current (I₁) as will be expressed by the following Equation:

$$I_1 = \frac{\text{Comparison Voltage (V}_1\text{)}}{\text{Resistance of Resistor 15}}.$$

As is expressed in the above Equation, that charge current (I₁) remains constant even with the variation in the r.p.m. of the engine if the resistance of the resistor 15 and the comparison voltage (V₁) are constant. As a result, the charge voltage of the condenser 16, i.e., the output voltage (D) of the ope-amp 17 linearly rises with a constant gradient independently of the r.p.m., as shown at letter (D) in FIG. 2. Thus, the output voltage (D) of the ope-amp 17 becomes that having a triangular wave as descends from the generation position (T₁) of the second angular signal (b) but again ascends when the output voltage (D) reaches the predetermined voltage at the (+) terminal of the comparator 18. The output voltage (D) thus far described is fed to the (+) terminal of the comparator 19 and is compared with the reference voltage (V₂) at the (−) terminal of the comparator 19 so that this comparator generates an output signal (E) at a high level during a time period for which the output voltage (D) of the ope-amp 17 is higher than the reference voltage (V₂). The other NOR gate 20 has its first gate fed with the output signal (E) of the comparator 19 and its second gate fed with the second angular signal (b) of the signal coil 8 so that its output takes a low level during the time period, for which the output signal (E) of the comparator 19 is at the high level, independently of the second angular signal (b) of the signal coil (8), as indicated by letter (F) in FIG. 2. On the other hand, the operations of the first F.F. circuit III, which is constructed of the thyristor 10, the resistor 11 and the transistor 12, will be described in the following. The first angular signal (a) of the signal coil 8 is fed to the gate of the thyristor 10 thereby to render the thyristor 10 conductive so that the anode terminal of the thyristor 10 is reversed from the high level based upon the power source voltage (Vcc) to the low level.

On the other hand, the second angular signal (b) of the signal coil 8 is fed to the base of the transistor 12 so that this transistor 12 is rendered conductive during the generation time period of the second angular signal (b). Since the anode current of the thyristor 19 is by-passed by that transistor 12, the thyristor 10 loses its self-maintaining action and is reversed to its inconductive condition. This comes from the difference in the operating characteristics between the thyristor 10 and the transistor 12. Since the transistor 12 becomes inconductive if the second angular signal (b) becomes substantially zero, an output signal at a connection between the collector of the transistor 12 and the anode of the thyristor 10, i.e., of the first F.F. circuit III is reversed from the low level to the high level. These operations will be described in more detail with reference to FIG. 2. The output signal (G) of the first F.F. circuit III is reversed from the high level to the low level at the generation position (T₂) of the first angular signal (a) and is again reversed from the low level to the high level when the second angular signal (b) reaches substantially zero at the generation position (T₁) of the second angular signal (b). When the NOR gate 21 has its first gate fed with the output signal (F) of the aforementioned NOR gate 20 and its second gate fed with the output signal (G) of the first F.F. circuit III, its output signal (H) is reversed from the low level to the high level, as indicated at numeral (H) in FIG. 2, when the output signal (F) of the NOR gate 20 breaks from the high level from the low level but from the high level to the low level when the output signal (G) of the first F.F. circuit III rises from the low level to the high level. When the output signal (H) of that NOR gate 21 is reversed from the low level to the high level, the transistor 22 is rendered conductive so that its emitter voltage (I) takes the high level, as indicated at letter (I) in FIG. 2, during the high level period of the output signal (H) of the NOR gate 21. As a result, the thyristor 7 has its gate fed with the trigger voltage and is rendered conductive to release the charges of the condenser 4 to the primary coil 5a of the ignition coil 5 so that a high voltage is induced at the secondary coil 5b of the ignition coil 5 thereby to make the ignition plug 6 spark.

From the description thus far made, it will be understood that the instant when the output voltage (D) of the ope-amp 17 reaches the reference voltage ($V_2$) of the comparator 19 between the crank positions ($T_1$) and ($T_2$) within the range, in which the r.p.m. of the engine is higher than ($N_2$) but lower than ($N_3$), as shown in FIG. 3, becomes the ignition timing, at which the engine is ignited. The operations, in which the ignition timing is angularly retarded with a constant gradient as the r.p.m. of the engine ascends from ($N_2$) to ($N_3$), will be described in detail in the following with reference to FIG. 4. FIG. 4 illustrates the triangular waveform output of the output voltage (D) of the ope-amp (17) during the time period from the crank position ($T_1$) to the next crank position ($T_1$). It has been described hereinbefore that the instant when the output voltage (D) of the ope-amp 17 reaches the reference voltage ($V_2$) of the comparator 19 becomes the ignition timing of the engine. It has also been described hereinabove that the discharge current ($I_2$) and the charge voltage ($I_1$) of the condenser 16, in which the ope-amp 17 generates its output voltage (D), are constant independently of the r.p.m. of the engine and that the descending and ascending gradients of the output voltage (D) are also constant.

Now, of numerals 51, 52, 53 and 54 appearing in FIG. 4 and indicating the output voltages (D) of the ope-amp 17, the former two 51 and 52 indicate the output voltages (D) in case the r.p.m. of the engine is at a value (Na) higher than ($N_2$) but lower than ($N_3$) whereas the latter two 53 and 54 indicate the output voltages (D) in case the r.p.m. of the engine is at a value (Nb) higher than (Na) but lower than ($N_3$).

Since the condenser 16 at the r.p.m. (Na) is discharged in the discharge current ($I_2$) from a crank position ($T_1$a) at which the second angular signal (b) is generated, the output voltage (D) of the ope-amp 17 linearly descends with a constant gradient, as indicated at 51. The second F.F. circuit 14 is reset with the positive pulse voltage of the comparator 18 at the instant when that output voltage (D) becomes lower than the potential at the (+) terminal of the comparator 18, i.e., at a position which is displaced an angle ($\alpha a$) from the crank position ($T_1$a). After that, the condenser 16 is again charged by the charge current ($I_1$) so that the output voltage (D) of the ope-amp 17 linearly ascends with a constant gradient, as indicated at 52. That output voltage (D) reaches the reference voltage ($V_2$) at a position which is displaced an angle ($\alpha a$) from the position where the second F.F. circuit 14 is reset, and this second F.F. circuit 14 is set by the second angular signal (b) at the next crank position ($T_1$a) in the ascending process of the output voltage (D) so that the condenser 16 again starts its descending operation in the discharge current ($I_2$).

At the r.p.m. (Nb), the condenser 16 likewise charges and discharges, and the output voltage (D) likewise operates to descend linearly with the constant gradient, as indicated at 53, to ascend linearly with the constant gradient, as indicated at 54, at a position which is displaced an angle ($\alpha b$) from the crank position ($T_1$b), to reach the reference voltage ($V_2$) at a position which is displaced therefrom an angle ($\gamma b$), and to descend again at the next crank position ($T_1$b).

Thus, during the process in which the r.p.m. of the engine ascends from (Na) to (Nb), the period between the crank position ($T_1$a) and the next crank position ($T_1$a) is shortened to the period between the crank position ($T_1$b) and the next crank position ($T_1$b).

Now, the angle between the position, in which the output voltage (D) at the r.p.m. (Na) reaches the reference voltage ($V_2$), and the next crank position ($T_1$a), i.e., the retardation angle ($\beta a$) is expressed by the following Equation if the angle of each crank position ($T_1$a) is $2\pi$:

$$\beta a = 2\pi - \alpha a - \gamma a,$$

wherein:

$$\gamma a = 2\pi \cdot \frac{ta \cdot Na}{60} \cdot \begin{bmatrix} ta: \text{Time} \\ Na: \text{R.P.M.} \end{bmatrix}$$

On the other hand, the angle between the position, in which the output voltage (D) at the r.p.m. (Nb) reaches the reference voltage ($V_2$), and the next crank position ($T_1$b), i.e., the retardation angle ($\beta b$) is expressed by the following Equation if the angle of each crank position ($T_1$b) is $2\pi$:

$$\beta b = 2\pi - \alpha b - \gamma b,$$

wherein:

$$\gamma b = 2\pi \cdot \frac{tb \cdot Nb}{60} \cdot \begin{bmatrix} tb: \text{Time} \\ Nb: \text{R.P.M.} \end{bmatrix}$$

Since the angles ($\alpha a$) and ($\alpha b$) appearing in the aforementioned respective Equations become constant, in other words, the ratio of the discharge period occupied in one revolution ($2\pi$) becomes constant, because the charge and discharge currents ($I_1$) and ($I_2$) are constant independently of the r.p.m., so that the relationship of $\alpha a = \alpha b$ holds independently of the r.p.m. On the other hand, since the times (ta) and (tb) are constant, in other words, the time period required for the terminal voltage of the condenser 16 to reach the comparison voltage ($V_2$), because the charge current ($I_1$) is constant independently of the r.p.m., so that the relationship of ta=tb holds independently of the r.p.m.

From the relationships thus far described, the retardation angle ($\beta$) is expressed by the following Equation:

$$\beta = 2\pi - \alpha - 2\pi \cdot \frac{t \cdot N}{60} \quad \begin{bmatrix} t\text{: Time} \\ N\text{: R.P.M.} \end{bmatrix}$$

As will be understood from the above Equation, the retardation angle ($\beta$) is determined as a function of the r.p.m. (N) by the constant angle ($\alpha$) and the constant time (t) such that it is reduced in proportion to the rise of the r.p.m. from (Na) to (Nb). This similarly applies to the case in which the r.p.m. ascends from ($N_2$) to ($N_3$). As a result, the ignition timing is angularly retarded with the predetermined gradient from the crank position ($T_2$) to the crank position ($T_1$) as the r.p.m. ascends from ($N_2$) to ($N_3$).

Thus, the retardation angle ($\beta$) is decreased to zero because, at the r.p.m. ($N_3$), the position in which the output voltage (D) of the ope-amp 17 during the charging process of the condenser 16 reaches the reference voltage ($V_2$) becomes the maximum retardation angle position ($T_1$).

The operations of the case in which the r.p.m. is more than ($N_3$) will be described in the following.

As the r.p.m. reaches $N_3$, the retardation angle ($\beta$) is reduced to zero. Since the output voltage (D) of the ope-amp 17 becomes lower than the reference voltage ($V_2$) when the r.p.m. exceeds ($N_3$), the output signal (E) of the comparator 19 always takes a low level, and this low level output signal (E) is fed to the first gate of the NOR gate 20. On the other hand, since the second gate of that NOR gate 20 is fed with the second angular signal (b), the output signal (F) of the NOR gate 20 takes the low level only during a period, for which the second angular signal (b) is at a high level, and is fed to the first gate of the NOR gate 21. On the other hand, the second gate of the NOR gate 21 is fed with the output signal (G) of the first F.F. circuit III, and this output signal (G) is reversed, as has been described before, from the high level to the low level in response to the first angular signal (a) of the signal coil (8) and from the low level to the high level, when the second angular signal (b) becomes substantial zero, so that the output signal (H) of the NOR gate (21) takes the high level only during the period for which the second angular signal (b) of the signal coil 8 is at the high level. When the output signal (H) at the high level is fed to the base of the transistor 22, this transistor 22 is rendered conductive so that the thyristor 7 is fed with the collector voltage (I) at the maximum retardation angle position ($T_1$) and is rendered conductive. Thus, at the r.p.m. more than $N_3$, the constant ignition timing is attained at the maximum retardation angle position ($T_1$), as shown in FIG. 3.

The operations in case the r.p.m. is higher than ($N_1$) but lower than ($N_2$) will be described in the following. Here, the fact that the retardation angle ($\beta$) becomes the larger as the r.p.m. is reduced from ($N_3$) to ($N_2$) will be understood from the Equation of $$\beta = 2\pi - \alpha - 2\pi \cdot \frac{t \cdot N}{60}.$$

Therefore, if the r.p.m. is further reduced from ($N_2$) to ($N_1$), the retardation angle ($\beta$) is gradually increased. Thus, within a range in which the r.p.m. is higher than ($N_1$) but lower than ($N_2$), the output voltage (D) of the ope-amp (17) is higher during the period of the retardation angle ($\beta$) than the reference voltage ($V_2$) of the comparator 19 so that the output signal (E) of the comparator 19 takes the high level. When the output signal (E) at the high level is fed to the first gate of the NOR gate 20, this NOR gate 20 generates, during the period of the retardation angle ($\beta$) independently of the signal of the second gate, the output signal (F) at the low level, which is fed to the first gate of the NOR gate 21. The second gate of this NOR gate 21 is fed with the output signal (G) of the first F.F. circuit III at the low level, as indicated at (G) in FIG. 2. As a result, the NOR gate 21 generates, only during the period from the maximum advance angle position ($T_2$), at which the first angular signal (a) is generated, to the maximum retardation angle position ($T_1$), at which the second angular signal (b) is generated, that output signal (H) at the high level, by which the transistor 22 is rendered conductive so that the thyristor 7 is fed with the collector voltage (I) at the maximum advance angle position ($T_2$) and is rendered conductive. Thus, within the range in which the r.p.m. is higher than ($N_1$) but lower than ($N_2$), the constant ignition timing is attained at the maximum advance angle position ($T_2$), as shown in FIG. 3.

The operations of the case in which the r.p.m. is less than ($N_1$) will be described in the following. With the r.p.m. being lower than ($N_1$), the retardation angle ($\beta$) is larger than the angle between the respective positions ($T_1$) and ($T_2$), as shown in FIG. 3, similarly to the case, in which the r.p.m. is lower than ($N_2$), so that the output signal (F) of the NOR gate 20 is at the low level during the period of the retardation angle ($\beta$), and this output signal (F) at the low level is fed to the first gate of the NOR gate 21. Here, the thyristor 10 of the first F.F. circuit III has its trigger level so preset that it is not turned on by the first angular signal (a) of the signal coil (8) so long as the r.p.m. is lower than ($N_1$). On the other hand, the transistor 12 is so preset that it is rendered conductive by the second angular signal (b). This comes from the difference in the operating characteristics between the thyristor 10 and the transistor 12. As a result, the second F.F. circuit III generates the output signal (G) at the low level only during the period for which it is fed with the second angular signal (b) of the signal coil 8. Since the output signal (G) at the low level is fed to the second gate of the NOR gate 21, the output signal (H) of this NOR gate 21 takes the high level only during the generation period of the second angular signal (b) of the signal coil 8, and the transistor 22 is rendered conductive by that output signal (H) at the high level so that the thyristor 7 is fed with the collector voltage I at the maximum retardation angle position ($T_1$) and is rendered conductive. Thus, with the r.p.m. being lower than ($N_1$), the constant ignition timing is attained at the maximum retardation angle position ($T_1$) shown in FIG. 3.

As has been detailed hereinbefore, according to the embodiment of the present invention, both the first angular signal (a) and the second angular signal (b), which are synchronous with the revolutions of the engine and which correspond to the maximum advance angle position ($T_2$) and the maximum retardation angle position ($T_1$), respectively, are used so that the maximum retardation angle position ($T_1$) generated by the second angular signal (b) is used as the ignition timing within the range in which the r.p.m. is lower than ($N_1$), so that the maximum advance angle position ($T_2$) generated by the first angular signal (a) is used as the ignition timing within the range in which the r.p.m. is higher than ($N_1$) but is lower than ($N_2$), so that the angle, at which the output voltage (D) of the ope-amp 17 reaches the predetermined voltage of the comparator 18 from the maximum the retardation angle position ($T_1$), is preset at the constant angle ($\alpha$) whereas the time period, for which the output voltage (D) reaches the reference voltage ($V_2$), is preset at the constant time period (t) within the range in which the r.p.m. is higher than ($N_2$) but lower than ($N_3$), whereby the ignition timing is angularly retarded with the constant gradient from the maximum advance angle position ($T_2$) to the maximum retardation angle position ($T_1$) in accordance with the rise in the r.p.m., and so that the maximum retardation angle position ($T_1$) is used as the ignition timing within the range in which the r.p.m. is more than ($N_3$), whereby the ignition timing characteristics shown in FIG. 3 are attained.

Incidentally, the present invention should not be limited to the embodiment thus far described but can include a variety of embodying modes. For example, the maximum advance angle position ($T_2$) and the maximum retardation angle position ($T_1$) can be suitably preset if the generating timings of the first and second angular signals (a) and (b) are altered. Moreover, the gradient of the retardation angle with respect to the r.p.m. (N) can be suitably preset if the constant angle ($\alpha$) and the constant time period (t) are vaird by adjusting either the charge currents ($I_1$) and ($I_2$) of the condenser 16 or the reference voltage ($V_2$). Still moreover, if the trigger level of the thyristor 11 of the first F.F. circuit III is lowered, even when the r.p.m. is lower than ($N_1$), so that the thyristor 11 is rendered conductive by the first angular signal (a), the ignition timing characteristics establishing the maximum advance angle position ($T_2$) even for the r.p.m. lower than ($N_1$) can be attained, as shown in FIG. 5. Furthermore, although the first and second angular signals (a) and (b) have make use of the alternating positive and negative outputs of the single signal coil 8, but they can be generated by the use of signal coils 8a and 8b which are made independently of each other.

Figure 7:
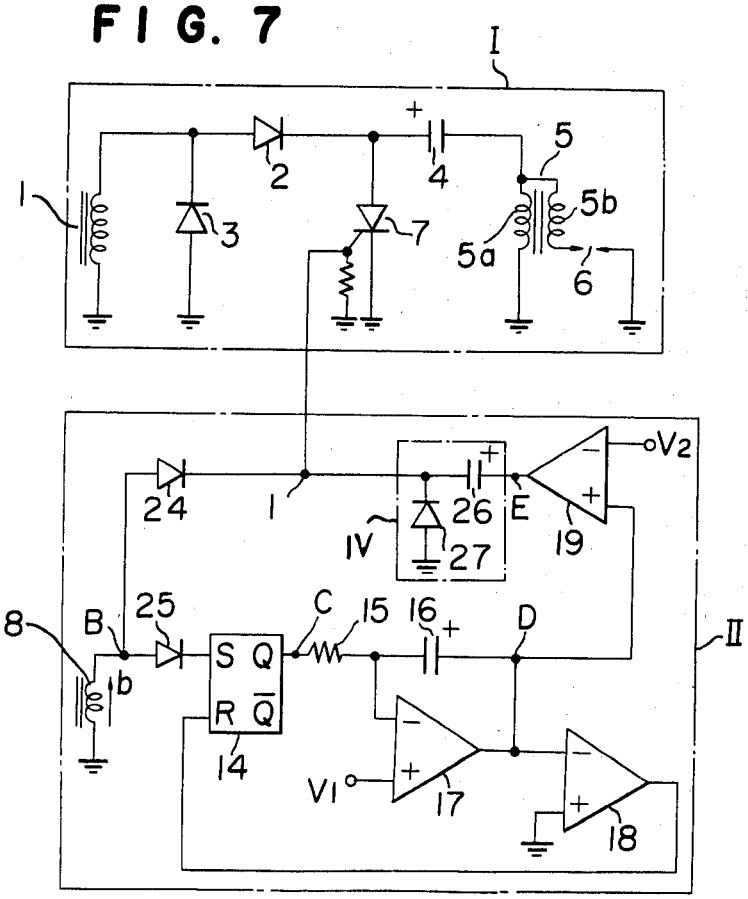
FIG. 7 is an electric circuit diagram showing another embodiment of the present invention.

Turning now to FIG. 7 showing another embodiment of the present invention, reference numeral 8 indicates the signal coil acting as an angular position detector, which is mounted in the aforementioned magnetic generator together with the generating coil 1, so that it generates the alternating positive and negative outputs in synchronism with the revolutions of the engine. Of those outputs, the output in the direction (b), i.e., the angular signal (b) corresponds to the predetermined crank position of that engine, i.e., the maximum retardation angle position ($T_1$) required by the engine. Indicated at numerals 24 and 25 are diodes which are operative to rectify the alternating positive and negative outputs of the signal coil 8 and which are connected with the gate of the thyristor 7 and the set terminal (S) of the flip-flop circuit (which will be shortly referred to as the F.F. circuit) 14, respectively.

Numerals 26 and 27 indicate a condenser and a diode, respectively, both of which constitute a pulse rise detecting detecting circuit IV.

This pulse rise detecting circuit (IV) is connected from the output terminal of the comparator 19 through the condenser 26 with the gate of the thyristor 7, and the diode 27 has its cathode connected with the gate of the thyristor 7 and its anode grounded to the earth.

The operations of the embodiment having the construction thus far described will be described with reference to FIG. 8.

Figure 8:
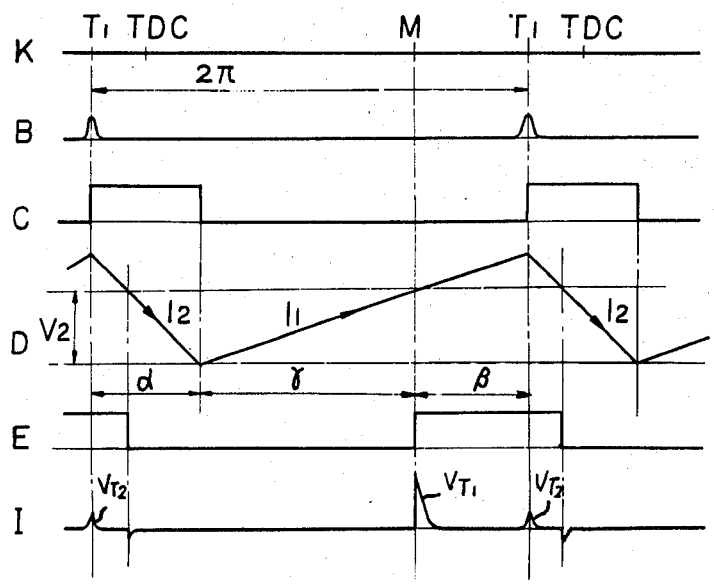
FIG. 8 is a waveform chart for illustrating the operations of the embodiment of FIG. 7.
Figure 9:
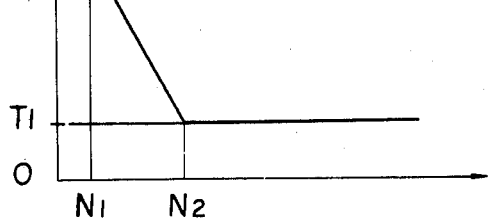
FIG. 9 is a characteristic curve of the ignition timing attained by the circuit of FIG. 7.

First of all, the operations in case the engine is revolving at a constant speed with an r.p.m. lower than ($N_2$), as shown in FIG. 9, will be described in the following. Similarly to the embodiment shown in FIG. 1, the output signal (E) at the high level is generated in the comparator 11 and is differentiated by the pulse rise detecting circuit IV thereby to generate the waveforms indicated at (I) in FIG. 8.

Specifically, the condenser 26 is charged in the shown polarity by the rise output signal (E) of the comparator 19 so that the this charge current generates the first tirgger voltage (which is indicated at $V_{T1}$) of the thyristor 7 at the position, as is indicated at (M) in FIG. 8. The charges stored in the condenser 26 are released through the diode 27 in response to the low level of the comparator 19 so that the preparation is made for the subsequent operations. A second trigger voltage ($V_{T2}$) at the ($T_1$) position indicated at (I) in FIG. 8 is the signal voltage, at which the angular signal (b) of the signal coil 8 is fed through the diode 24 to the gate of the thyristor 7, but the first trigger voltage ($V_{T1}$) indicated at (I) in FIG. 8 is generated, in case the r.p.m. of the engine is lower than ($N_2$), at the position (M) which is advanced a predetermined angle from the position wherein the second trigger voltage ($V_{T2}$) is generated.

Thus, the thyristor 7 has its gate fed with the first trigger voltage ($V_{T1}$) by the comparator 19 earlier than the second trigger voltage ($V_{T2}$) by the signal coil 8 so that the thyristor 7 is rendered conductive at the position (M) to release the charges to the primary coil 5a of the ignition coil 5 out of the condenser 4, whereby a high voltage is induced at the secondary coil 5b of the ignition coil 5 to make the ignition plug 6 spark. As a result, even if the second trigger voltage ($V_{T2}$) is fed at the position ($T_1$) to the thyristor 7, the condenser 4 has no charge stored to constitute no contribution to the spark. From the foregoing description, it will be understood that the instant, at which the output voltage (D) of the ope-amp 17 reaches the reference voltage ($V_2$) of the comparator 19, is used as the ignition timing thereby to effect the ignition of the engine within the range in which the r.p.m. of the engine is lower than ($N_2$) shown in FIG. 9.

The operations, in which the ignition timing is angularly retarded with a constant gradient in accordance with the rise of the r.p.m. of the engine from zero to ($N_2$), will be described in the following. From the relationship of FIG. 4 illustrating the operations of the embodiment of FIG. 4, the retardation angle ($\beta$) is expressed by the following Equation:

$$\beta = 2\pi - \alpha - 2\pi \cdot \frac{t \cdot N}{60} \quad \begin{bmatrix} t\text{: Time} \\ N\text{: R.P.M.} \end{bmatrix}$$

As will be understood from the above Equation, the retardation angle ($\beta$) is determined as a function of the r.p.m. (N) by the constant angle ($\alpha$) and the constant time (t) so that it is reduced in proportion to the rise in the r.p.m. from (Na) to (Nb). As a result, the generation timing of the output of the pulse rise detecting circuit IV, i.e., the generation timing of the first trigger voltage ($V_{T1}$) is retarded in accordance with the rise in the r.p.m. This can similarly apply to the case, in which the r.p.m. ascends from zero to ($N_2$) so that the ignition timing has its retardation angle ($\beta$) retarded with a predetermined gradient from ($2\pi-\alpha$) degrees to the zero degree in accordance with the rise in the r.p.m. from the zero to ($N_2$).

Thus, the retardation angle ($\beta$) is reduced to zero so that the position, at which the output voltage (D) of the ope-amp 17 in the charging process of the condenser 16 reaches the reference voltage ($V_2$) becomes the maximum retardation angle position ($T_1$) when the r.p.m. reaches ($N_2$), until it becomes zero. As a result, the first trigger voltage ($V_{T1}$) is generated at the maximum retardation angle position ($T_1$) so that the ignition timing takes place at the ($T_1$) position.

The operations in case the r.p.m. is more than ($N_2$) will be described in the following.

Since the retardation angle ($\beta$) becomes zero, as has been described in the above, in case the r.p.m. is more than ($N_2$) and since the output voltage (D) of the ope-amp 17 becomes lower than the reference voltage ($V_2$) when the r.p.m. becomes more than ($N_2$), the output signal (E) of the comparator 19 always takes a low level so that no output, i.e., none of the first trigger voltage ($V_{T1}$) is generated in the pulse rise detecting circuit IV.

As a result, since the gate of the thyristor 7 is fed with the second trigger voltage ($V_{T2}$) of the signal coil that is generated at the maximum retardation angle position ($T_1$), the ignition timing becomes constant at the maximum retardation angle position ($T_1$) for the case in which the r.p.m. of the engine is more than ($N_2$).

As has been described in detail hereinbefore, according to the embodiment of the present invention, the angular signal (b) synchronizing with the revolutions of the engine and corresponding to the maximum retardation angle position ($T_1$) is used so that the angle at which the output voltage (D) of the ope-amp 17 reaches the predetermined value from the maximum retardation angle position ($T_1$) is preset at the constant angle ($\alpha$) within the range in which the r.p.m. is lower than ($N_2$) whereas the time period for which the output voltage (D) reaches the reference voltage ($V_2$) from the aforementioned predetermined value is preset at the constant time period (t) thereby to attain the ignition timing which is angularly retarded with the constant gradient from the maximum advance angle position ($2\pi-\alpha$) to the maximum retardation angle position ($T_1$) in accordance with the rise in the r.p.m. and so that the maximum retardation angle position ($T_1$) is used as the ignition timing within the range, in which the r.p.m. is higher than ($N_2$), whereby the ignition timing characteristics shown in FIG. 9 can be attained.

Figure 10:
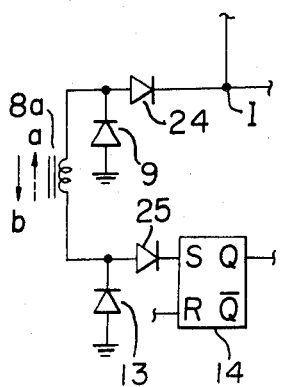
FIG. 10 is an electric circuit diagram showing the essential portion of a further embodiment.

Turning now to FIG. 10 showing another embodiment of the present invention, the first angular signal (b), as indicated at a solid line, of the alternating positive and negative outputs which are generated in the signal coil 8a corresponds to the maximum retardation angle position ($T_1$), i.e., the first crank position, whereas the second angular signal (a), as indicated at a broken line, corresponds to the second crank position ($T_2$) which is slightly advanced from the maximum retardation angle position ($T_1$). That second crank position ($T_2$) substantially becomes the maximum retardation angle position that is required by the engine. Those first and second angular signals (a) and (b) are prepared by rectifying the full waveforms of the alternating positive and negative outputs of the signal coil 8a by means of the diodes 9, 13, 24 and 25 so that the first angular signal (b) is fed to the F.F. circuit 14 whereas the second angular signal (a) is fed to the gate of the thyristor 7.

Figure 11:
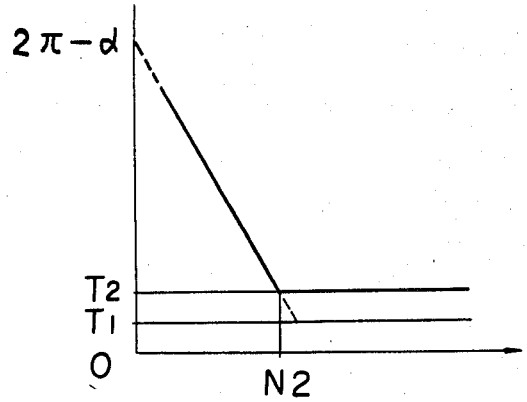
FIG. 11 is a characteristic curve of the ignition timing attained by the circuit of FIG. 10.

Now, let it be assumed that the ignition timing characteristics fo the engine are those shown in FIG. 11 similarly to the foregoing embodiment. It is similar to the foregoing embodiment that the angular retardation characteristics having the constant gradient can be attained by the first angular signal (b) generated at the first crank position ($T_1$). Now, when the r.p.m. of the engine reaches ($N_2$), both the second angular signal (a) generated at the second crank position ($T_2$) and the trigger violtage ($V_{T1}$) based upon the first angular signal (b) are fed to the gate of the thyristor 7 so that this thyristor 7 is rendered conductive. And, when the r.p.m. exceeds ($N_2$), the generation timing of the second angular signal (a) goes ahead of the generation timing of the trigger voltage ($V_{T1}$) so that the thyristor 7 has its gate fed with the second angular signal (a) and is rendered conductive. Since the generating timing of that second angular signal (a) is constant independently of the r.p.m., the ignition timing takes place the second crank position ($T_2$), i.e., substantially the maximum retardation angle position.

Thus, if the first angular signal (b) for attaining the angular retardation characteristics and the second angular signal (a) for attaining the maximum constant retardation angle position are respectively used, the angular retardation characteristics and the maximum retardation angle position can be preset independently of each other so that the degree of freedom for presetting the ignition timing characteristics can be improved. Moreover, since the one wave of the signal coil 8a is used, the production can be made without increasing the number of parts.

Figure 12:
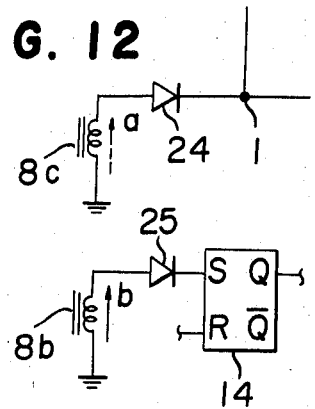
FIG. 12 is an electric circuit diagram showing the essential portion of a further embodiment.

FIG. 12 shown another embodiment, in which the signal coils 8b and 8c made independent of each other are used as the signal coils for generating the first and second angular signals (b) and (a). In this embodiment, it is possible to adjust the generation timings of the first and second angular signals (b) and (a) with remarkable ease.

According to the present invention, incidentally, the ignition timing characteristics, in which the angular retardation takes place with the constant gradient from the maximum advance angle ($2\pi-\alpha$) to the zero advance angle, can be attained if the maximum retardation angle position ($T_1$) is made to approach the top dead center of the engine. Moreover, it is possible to preset the maximum advance angle ($2\pi-\alpha$) at a desired value by adjusting the constant angle ($\alpha$) and to desirably preset the gradient of the retardation angle.

As has been described hereinbefore, according to the present embodiment, firstly, the angular signal to be generated at the predetermined crank position is used so that the ratio of the angle, at which such a discharge output of the triangular wave of an integrator made operative to repeat its charging and discharging operations in the constant current as intervenes between each of the adjacent crank positions reaches the first predetermined value, is made constant relative to said angular signal thereby to preset the constant angle ($\alpha$) and so that the time period, for which such a charge output of the triangular wave of said integrator as intervenes between each of the adjacent crank positions reaches the second predetermined value, is made constant relative to said angular signal thereby to preset the constant time period (t), whereby the timing, at which said charge output reaches the second predetermined value, is retarded because of said constant time period in accordance with the r.p.m. of the engine so that the generation timing of the trigger output is retarded in accordance with the rise in the r.p.m. of the engine thereby to attain the ignition retardation characteristics having the constant gradient.

Secondly, either the angular signal to be generated at the predetermined crank position or the grigger output having its generation timing retarded in accordance with the rise in the r.p.m. of the engine is used as the signal for determining the ignition timing so that the angular retardation characteristics and the constant ignition timing characteristics subsequent to those angular retardation characteristics are attained.

Thirdly, the first angular signal to be generated at the first predetermined crank position and the second angular signal to be generated at the second crank position different from the first-named crank position are used to attain the angular retardation characteristics having their generation timings retarded and the constant ignition timing characteristics from the first- and second-named angular signals, respectively, whereby the angular retardation characteristics and the constant ignition timing characteristics can be preset independently of each other so that the degree of freedom of presetting the ignition timing characteristics required by the engine can be remarkably improved.

Figure 13:
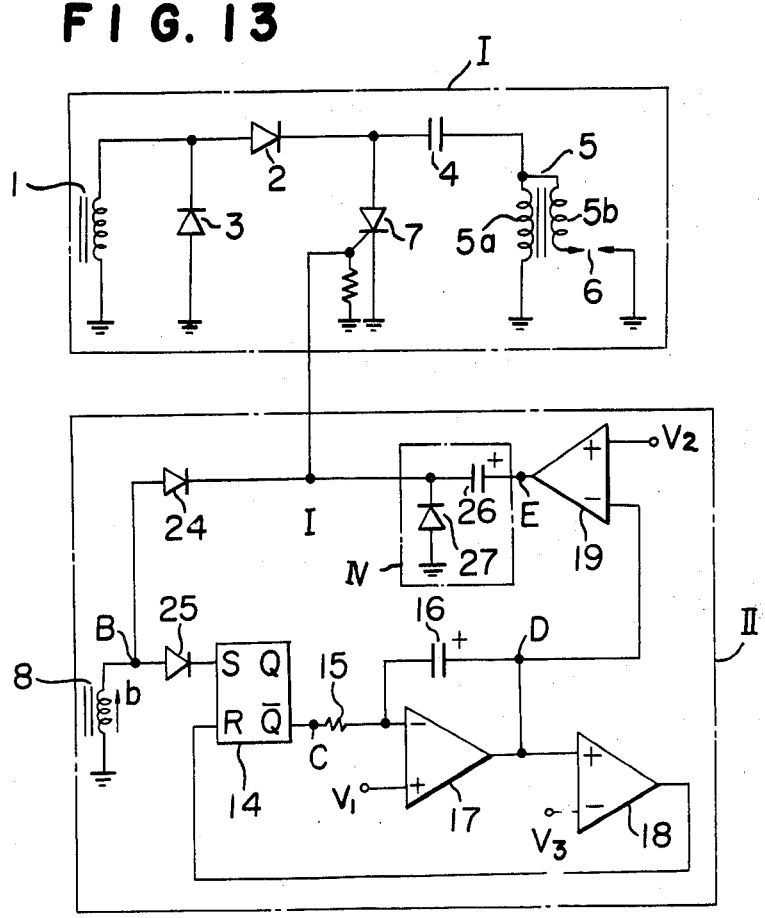
FIG. 13 is an electric circuit diagram showing a further embodiment.

On the other hand, a further embodiment is shown in FIG. 13. The F.F. circuit 14 has its output terminal ($\overline{Q}$) connected through the resistor 15 with the reversed input terminal (which will be referred to as the (−) terminal) of the ope-amp 17. The output terminal of this ope-amp 17 is connected with the non-reversed input terminal (which will be referred to as the (+) terminal) of the comparator 15 and with the (−) terminal of the same through the condenser 16. On the other hand, the ope-amp 17 has its one terminal biased to the reference voltage ($V_1$), whereas the comparator 18 has its (−) terminal biased to the reference voltage ($V_3$). The other comparator 19 has its (−) terminal connected with the output terminal of the ape-amp 17 and its (+) terminal biased to a reference voltage ($V_2$).

Figure 14:
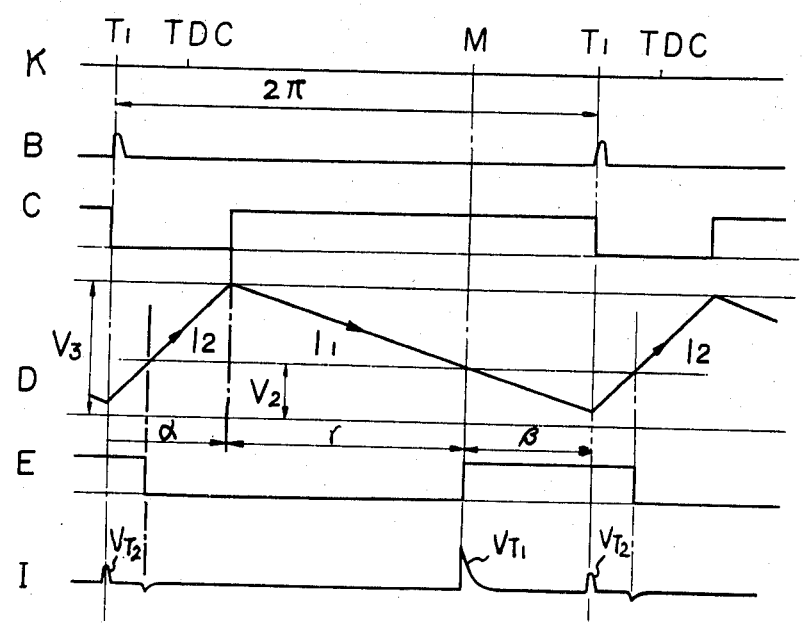
FIG. 14 is a waveform chart for illustrating the operations of the embodiment of FIG. 13.

The operations of the embodiment having the construction thus far described will be described in detail with reference to the operation chart shown in FIG. 14. Indicated at letters (K), (TDC) and (T$_1$) in FIG. 14 are the crank position of the engine, the top dead center of the engine, and the predetermined crank position or the maximum angular retardation of the engine, at which the angular signal (b) is generated. Numerals (B) to (I) indicate the voltage and pulse waveforms of the respective portions shown in FIG. 13.

Let it be assumed here that the engine requires the ignition timing characteristics shown in FIG. 9.

First of all, the operations in case the engine is revolving at a constant speed with such an r.p.m. as is smaller than ($N_2$), as shown in FIG. 9. In a manner to correspond to the crank position ($T_1$), the signal coil 8 generates such an angular signal (b) once each revolution of the engine as has its angular width narrowed and steeply varied. If the set terminal (S) of the F.F. circuit 14 is fed through the diode 25 with the angular signal (b), the output terminal ($\overline{Q}$) of the same takes a low level. As a result, that condenser 16 is charged in such a current ($I_2$) as will be expressed by the following Equation:

$$I_2 = \frac{\text{Reference Voltage } (V_1)}{\text{Resistance of Resistor 15}}.$$

As is expressed by the above Equation, that charge current ($I_2$) remains constant even with the variation in the r.p.m. of the engine if the resistance of the resistor 15 and the reference voltage ($V_1$) are constant. When the condenser 16 is charged in that charge current ($I_2$), the output voltage (D) of the ope-amp 17 linearly ascends with a constant gradient independently of the r.p.m., as indicated at (D) in FIG. 14. When that output voltage (D) exceeds the reference voltage ($V_3$) at the (−) terminal of the comparator 18, a positive pulse voltage is generated at the output of the comparator 18. When the F.F. circuit 14 has its reset terminal (R) fed with that positive pulse voltage, it is reversed so that its output terminal ($\overline{Q}$) takes a high level.

In response to the high level at the output terminal ($\overline{Q}$) of that F.F. circuit 14, the charges are released from the condenser 16 in such a current ($I_1$) as will be expressed by the following Equation:

$$I_1 = \frac{\substack{\text{High Level Voltage} \\ \text{of F.F. CKT 14}} - \text{Reference Voltage } (V_1)}{\text{Resistance of Resistor 15}}.$$

As is expressed in the above Equation, that discharge current ($I_1$) remains constant even with the variation in the r.p.m. of the engine if the high level volage of the F.F. circuit 14, the resistance of the resistor 15 and the reference voltage ($V_1$) are constant. As a result, the discharge voltage of the condenser 16, i.e., the output voltage (D) of the ope-amp 17 linearly descends with a constant gradient independently of the r.p.m., as shown at letter (D) in FIG. 14. Thus, the output voltage (D) of the ope-amp 17 becomes that having a triangular wave as ascends from the maximum retardation angle position ($T_1$) at which the angular signal (b) is generated but again descends when the output voltage (D) reaches the predetermined voltage at the (−) terminal of the comparator 18. The output voltage (D) thus far described is fed to the (−) terminal of the comparator 19 and is compared with the reference voltage ($V_2$) at the (+) terminal of the comparator 19 so that this comparator generates an output signal (E) at a high level during a time period for which the output voltage (D) of the ope-amp 17 is lower than the reference voltage ($V_2$).

The output signal (E) at the high level is generated in the comparator 19 and is differentiated by the pulse rise detecting circuit IV thereby to generate the waveforms indicated at ($V_{T1}$) of (I) in FIG. 14.

Thus, the thyristor 7 has its gate fed with the first trigger voltage ($V_{T1}$) by the comparator 19 earlier than the second trigger voltage ($V_{T2}$) by the signal coil 8 so that the thyristor 7 is rendered conductive at the position (M).

From the foregoing description, it will be understood that the instant, at which the output voltage (D) of the ope-amp 17 reaches the reference voltage ($V_2$) of the comparator 19, is used as the ignition timing thereby to effect the ignition of the engine within the range in which the r.p.m. of the engine is lower than ($N_2$) shown in FIG. 9.

Figure 15:
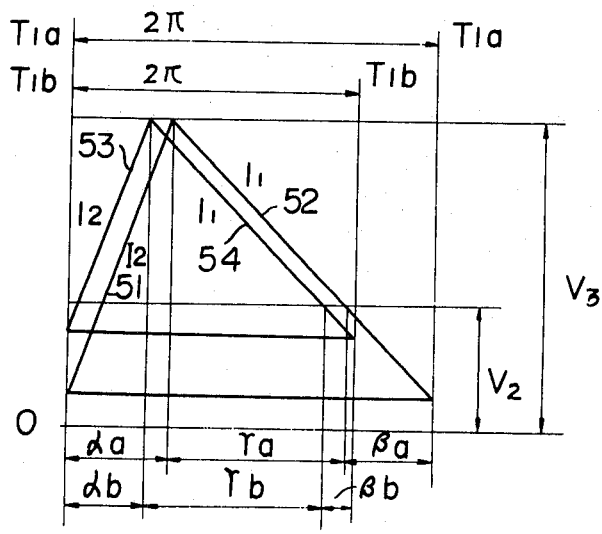
FIG. 15 is a waveform chart for illustrating the angularly retarding operations of the embodiment of FIG. 13.

The operations, in which the ignition timing is angularly retarded with a constant gradient in accordance with the rise of the r.p.m. of the engine from zero to ($N_2$), will be described in the following with reference to FIG. 15.

Since the condenser 16 at the r.p.m. ($N_a$) is charged in the charge current ($I_2$) similarly to FIG. 4 from the crank position ($T_1a$) at which the angular signal (b) is generated, the output voltage (D) of the ope-amp 17 linearly descends with a constant gradient, as indicated at 51. The F.F. circuit 14 is reset with the positive pulse voltage of the comparator 18 at the instant when the output voltage (D) reaches the reference voltage ($V_3$) at the (−) terminal of the comparator 18, i.e., at the position which is displaced the angle ($\alpha a$) from the crank position ($T_1a$). After that, the condenser 16 is again discharged by the discharge current ($I_1$) so that the output voltage (D) of the ope-amp 17 linearly descends with a constant gradient, as indicated at 52. That output voltage 52 reaches the reference voltage ($V_2$) at a position which is displaced the angle ($\gamma a$) from the position where the F.F. circuit 14 is reset, and this F.F. circuit 14 is set by the angular signal (b) at the next crank position ($T_1a$) in the descending process of the output voltage (D) so that the condenser 16 again starts its charging operation in the charge current ($I_2$).

At the r.p.m. ($N_b$), the condenser 16 likewise charges and discharges, and the output voltage (D) likewise operates to ascend linearly with the constant gradient, as indicated at 53, to descend linearly with the constant gradient, as indicated at 54, at a position which is displaced the angle ($\alpha b$) from the crank position ($T_1b$), to reach the reference voltage ($V_2$) at a position which is displaced therefrom an angle ($\gamma b$), and to ascend again at the next crank position ($T_1b$).

Thus, during the process in which the r.p.m. of the engine ascends from ($N_a$) to ($N_b$), the period between the crank position ($T_1a$) and the next crank position ($T_1a$) is shortened to the period between the crank position ($T_1a$) and the next crank position ($T_1b$).

Now, the angle between the position, in which the output voltage (D) at the r.p.m. ($N_a$) reaches the reference voltage ($V_2$), and the next crank position ($T_1a$), i.e., the retardation angle ($\beta a$) is expressed by the following Equation if the angle of each crank position ($T_1a$) is $2\pi$:

$$\beta a = 2\pi - \alpha a - \gamma a,$$

wherein:

$$\gamma a = 2\pi \cdot \frac{ta \cdot Na}{60} \cdot \begin{bmatrix} ta: \text{Time} \\ Na: \text{R.P.M.} \end{bmatrix}$$

On the other hand, the angle between the position, in which the output voltage (D) at the r.p.m. ($N_b$) reaches the reference voltage ($V_2$), and the next crank position ($T_1b$), i.e., the retardation angle ($\beta b$) is expressed by the following Equation if the angle of each crank position ($T_1b$) is $2\pi$:

$$\beta b = 2\pi - \alpha b - \gamma b,$$

wherein:

$$\gamma b = 2\pi \cdot \frac{tb \cdot Nb}{60} \cdot \begin{bmatrix} tb: \text{Time} \\ Nb: \text{R.P.M.} \end{bmatrix}$$

Since the angles ($\alpha a$) and ($\alpha b$) appearing the aforementioned respective Equations become constant, in other words, the ratio of the discharge period occupied in one revolution ($2\pi$) becomes constant, because the discharge and charge currents ($I_1$) and ($I_2$) are constant independently of the r.p.m., so that the relationship of $\alpha a = \alpha b$ holds independently of the r.p.m. On the other hand, since the times (ta) and (tb) are constant, in other words, the time period required for the terminal voltage of the condenser 16 to reach the comparison voltage ($V_2$) of the comparator 19 from the reference voltage ($V_3$) of the comparator 18, because the discharge current ($I_1$) is constant independently of the r.p.m., so that the relationship of ta=tb holds independently of the r.p.m.

From the relationships thus far described, the retardation angle ($\beta$) is expressed by the following Equation:

$$\beta = 2\pi - \alpha - 2\pi \cdot \frac{t \cdot N}{60} \cdot \begin{bmatrix} t: \text{Time} \\ N: \text{R.P.M.} \end{bmatrix}$$

As will be understood from the above Equation, the retardation angle ($\beta$) is determined as a function of the r.p.m. (N) by the constant angle ($\alpha$) and the constant time (t) so that it is reduced in proportion to the rise in the r.p.m. from ($N_a$) to ($N_b$). As a result, the generation timing of the output of the pulse rise detecting circuit IV, i.e., the generation timing of the first trigger voltage ($V_{T1}$) is retarded in accordance with the rise in the r.p.m. This can similarly apply to the case, in which the r.p.m. ascends from zero to ($N_2$) so that ignition timing has its retardation angle ($\beta$) retarded with a predetermined gradient from ($2\pi - \alpha$) degrees to the zerpo degree in accordance with the rise in the r.p.m. from the zero to ($N_2$).

Thus, the retardation angle ($\beta$) is reduced to zero so that the position, at which the output voltage (D) of the ope-amp 17 in the charging process of the condenser 16 reaches the reference voltage ($V_2$) of the comparator 19 from the reference voltage ($V_1$) of the comparator 18 bcomes the maximum retardation angle position ($T_1$) when the r.p.m. reaches ($N_2$), until it becomes zero. As a result, the first trigger voltage ($V_{t1}$) is generated at the maximum retardation angle position ($T_1$) so that the ignition timing takes place at the ($T_1$) position.

The operations in case the r.p.m. is more than ($N_2$) will be described in the following.

Since the retardation angle ($\beta$) becomes zero, as has been described in the above, in case the r.p.m. is more than ($N_2$) and since the output voltage (D) of the ope-amp 17 becomes higher than the reference voltage ($V_2$) of the comparator 19 when the r.p.m. becomes more than ($N_2$), the output signal (E) of the comparator 19 always takes a low level so that no output, i.e., none of the first trigger voltage ($V_{T1}$) is generated in the pulse rise detecting circuit IV.

As a result, since the gate of the thyristor 7 is fed with the first trigger voltage ($V_{T2}$) of the signal coil that is generated at the maximum retardation angle position ($T_1$), the ignition timing becomes constant at the maximum retardation angle position ($T_1$) for the case in which the r.p.m. of the engine is more than ($N_2$).

As has been described in detail hereinbefore, according to the embodiment of the present invention, the angular signal (b) synchronizing with the revolution of the engine and corresponding to the maximum retardation angle position ($T_1$) is used so that the angle at which the output voltage (D) of the ope-amp 17 reaches the predetermined value from the maximum retardation angle position ($T_1$) is preset at the constant angle ($\alpha$) within the range in which the r.p.m. is lower than ($N_2$) whereas the time period fro which the output voltage (D) reaches the reference voltage ($V_3$) from the aforementioned predetermined value is preset at the constant time period (t) thereby to attain the ignition timing which is angularly retarded with the constant gradient from the maximum advance angle position ($2\pi-\alpha$) to the maximum retardation angle position ($T_1$) in accordance with the rise in the r.p.m. and so that the maximum retardation angle position ($T_1$) is used as the ignition timing within the range, in which the r.p.m. is higher than ($N_2$), whereby the ignition timing characteristics shown in FIG. 9 can be attained.

Figure 16:
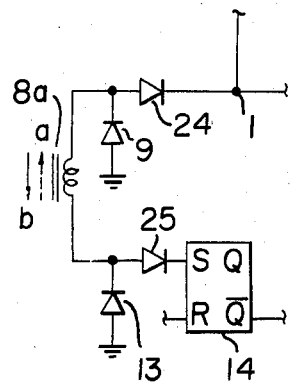
FIG. 16 is an electric circuit diagram showing the essential portion of a further embodiment.
Figure 17:
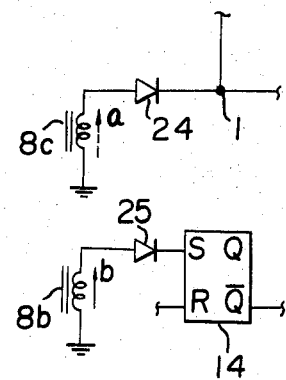
FIG. 17 is an electric circuit diagram showing the essential portion of a further embodiment.

As has been described hereinbefore, according to the present invention shown in FIGS. 13, 16 and 17, firstly, the angular signal to be generated at the predetermined crank position is used so that the ratio of the angle, at which such a discharge output of the triangular wave of the intergrator made operative to repeat its charging and discharging operations in the constant current as intervenes between each of the adjacent crank positions reaches the first predetermined value, is made constant relative to said angular signal thereby to preset the constant angle ($\alpha$) and so that the time period, for which such a charge output of the triangular wave of said integrator as intervenes between each of the adhacent crank positions reaches the second predetermined value, is made constant relative to said angular signal thereby to preset the constnat time period (t), whereby the timing, at which said charge output reaches the second predetermined value, is retarded because of said constant time period in accordance with the r.p.m. of the engine so that the generation timing of the trigger output is retarded in accordance with the rise in the r.p.m. of the engine thereby to attain the ignition retardation characteristics having the constant gradient.

Figure 18:
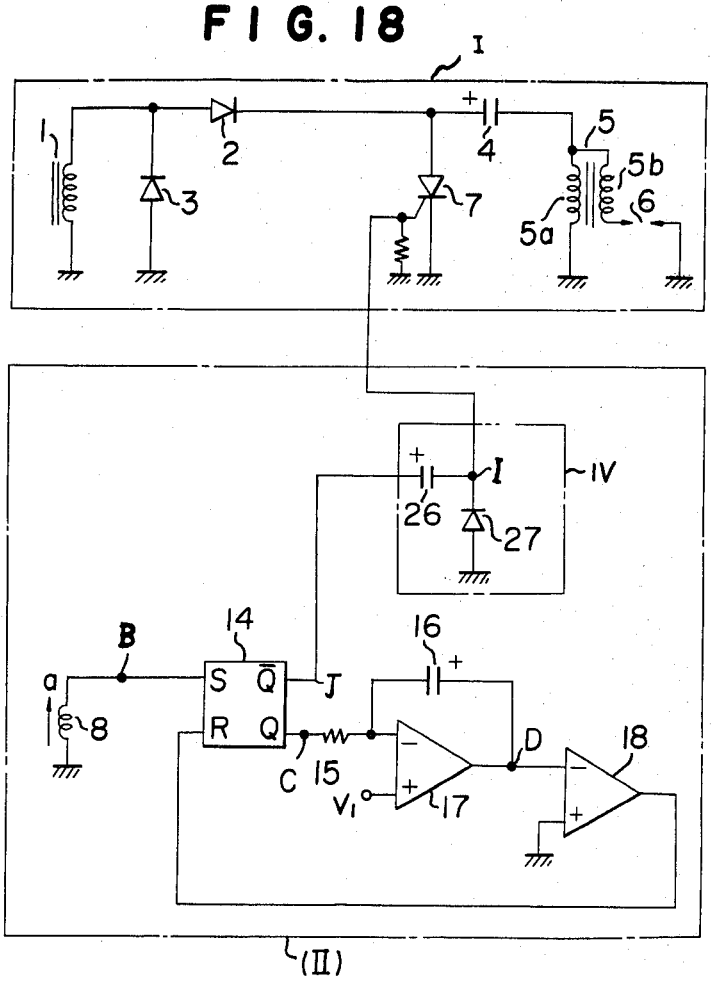
FIG. 18 is an electric circuit diagram showing a further embodiment of the present invention.

Turning now to FIG. 18, there is shown a further embodiment of the present invention. The F.F. circuit 14 has its set terminal (S) connected with the B terminal of the signal coil 8 and its output terminal (Q) connected through the resistor 15 with the reversed input terinal (which will be referred to as the (−) terminal) of the ope-amp 17. The output terminal of this ope-amp 17 is connected with not only the (−) terminal of the comparator 18 but also the (−) terminal of itself through the condenser 16. On the other hand, the non-reversed input terminal (which will be referred to as the (+) terminal) of the ope-amp 17 is biased to the reference voltage ($V_1$) whereas the (+) terminal of the comparator 18 is grounded to the earth.

The output terminal ($\bar{Q}$) of the F.F. circuit 14 is connected through the condenser 26 with the gate of the thyristor 7 of the ignition device I. Indicated at numeral 27 is the diode which is connected between the gate of the thyristor 7 and the earth. Those condenser 26 and diode 27 constitute together the pulse rise detecting circuit IV.

The operations of the embodiment having the construction thus far described will be detailed with reference to the operation chart shown in FIG. 19. The charge voltage of the condenser 16, i.e., the output voltage (D) of the ope-amp 17 linearly ascends with a constant gradient independently of the r.p.m., as indicated at (D) in FIG. 19. The output voltage (D) of the ope-amp 17 is saturated at the power source voltage (Vcc) when it reaches this value while it is ascending.

Thus, the output voltage (D) of the ope-amp 17 becomes the output of such a triangular wave as to descend from the generation position ($T_1$) of the angular signal (a) and to ascend again when it reaches the voltage at the (+) terminal of the comparator 18. This triangular wave is so preset that it is saturated at the power source voltage (Vcc) during the ascending operation when the r.p.m. of the engine is lower than $N_1$.

Figure 19:
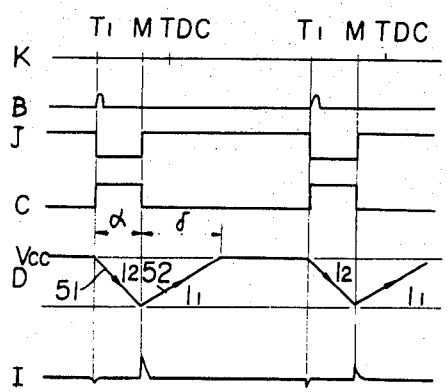
FIGS. 19 and 20 are waveform charts illustrating the operations of the embodiment of FIG. 18.

By the operations thus far described, the output terminal (Q) of the F.F. circuit 14 has its level reversed from low to high at the crank position ($T_1$) at which the angular signal (a) is generated, as indicated at (C) in FIG. 19, so that it maintains the high level only during the discharge period of the discharge current ($I_2$) of the condenser 16. At the time when the output voltage (D) of the ope-amp 17 reaches the voltage at the (+) terminal of the comparator 18, the output terminal (Q) of the F.F. circuit 14 is reversed from the high level to the low level by the positive pulse voltage of the comparator 18 so that it is prepared for the set signal by the subsequent angular signal (a). The reversed output ($\bar{Q}$) of that output (Q) of that F.F. circuit 14 is reversed from the low level to the high level, when the output voltage (D) of the ope-amp 17 reaches the voltage at the (+) terminal of the comparator 18, and this rise signal (J) charges the condenser 26 with the shown polarity so that the trigger voltage (I) of the thyristor 7 is generated, at the position (M) of FIG. 19, by that charge current. The charges stored in the condenser 26 are released through the diode 27, because the output terminal ($\bar{Q}$) of the F.F. circuit 14 is at the low level, thereby to prepare the subsequent operations.

As has been described hereinbefore, the thyristor 7 receives the trigger voltage (I) at the position (M), which is retarded from the postion ($T_1$) for the generation of the angular signal (a), so that it is rendered conductive to release the charges from the condenser 4 to the primary coil 5a of the ignition coil 5. As a result, a high voltage is induced at the secondary coil 5b of the same thereby to make the ignition plug 6 spark.

Figure 21:
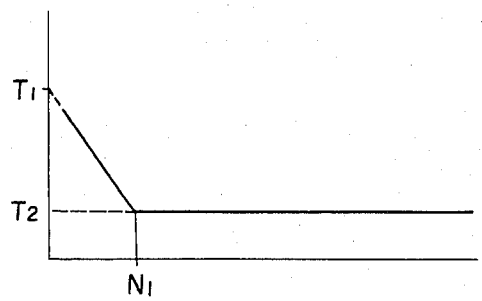
FIG. 21 is a characteristic curve of the ignition timing attained by the circuit of FIG. 18.

From the foregoing description, it can be understood that the instant when the output voltage (D) of the ope-amp 17 reaches the voltage at the (+) terminal of the comparator 18 within the range in which the r.p.m. of the engine is lower than ($N_1$), shown in FIG. 21, thereby to effect the ignition of the engine.

The operations, in which the ignition timing is angularly retarded with the constant gradient in accordance with the rise in the r.p.m. of the engine from zero to ($N_1$), will be described in detail in the following with reference to FIG. 19.

Here, it has also been described that the instant when the output voltage (D) of the ope-amp 17 reaches the voltage at the (+) terminal of the comparator 18 becomes the ignition timing. The discharge and charge currents ($I_2$) and ($I_1$) of the condenser (16), which constitutes the integrator together with the ope-amp 17, take constant values irrespective of the r.p.m. of the engine, and the ascending and descending gradients of the output voltage (D) of the ope-amp 17 also take constant values, as has been described hereinbefore.

Now, let it be assumed that the interval between the crank position ($T_1$) and the next crank position ($T_1$), as shown in FIG. 19, is the time width at such an r.p.m. Na as is higher than zero but lower than ($N_1$). Since, at this r.p.m. Na, the condenser 16 discharges in the discharge current ($I_2$) from the crank position ($T_1$) at which the angular signal (a) is generated, the output voltage (D) of the ope-amp 17 linearly descends with the constant gradient, as indicated at 51. At the instant when that output voltage (D) becomes lower than the voltage at the (+) terminal of the comparator 18, in other words, at the position which is displaced the angle (α) from the crank position (T₁), the F.F. circuit 14 is reset by the positive pulse voltage of the comparator 18 so that the output terminal (Q) of the F.F. circuit 14 takes the low level. Then, the condenser 16 is charged again with the charge current (I₁) so that the output voltage (D) of the ope-amp 17 linearly ascends with the constant gradient, as indicated at 52. That output voltage (D) reaches the power source voltage (Vcc) at the position which is displaced the angle δ from the position wherein the F.F. circuit 14 has been reset, so that it is subsequently saturated at the voltage (Vcc). When the F.F. circuit 14 is set at the next crank position (T₁) by the angular signal (a) so that the output terminal (Q) takes the high level, the condenser 16 starts again its discharging operation in the discharge current (I₂).

Here, if the angle of the output voltage (D) descending at the r.p.m. Na between the crank position (T₁) and the position (M) in which the voltage (D) reaches the voltage at the (+) terminal of the comparator 18, i.e., the retardation angle (α) is expressed by the following Equation in case the angle between each of the adjacent crank positions (T₁):

$$\alpha = 2\pi \cdot \frac{t \cdot Na}{60},$$

wherein: letter t denotes the time; and letters Na denote the r.p.m.

Since the time (t) appearing in the above Equation takes the constant value (t), which is required for the output voltage (D) to reach the voltage at the (+) terminal of the comparator 18 because the dischage current (I₂) and the power source voltage (Vcc) are constant irrespective of the r.p.m., that time (t) becomes constant irrespective of the r.p.m.

As will be understood from the above Equation, therefore, the retardation angle (α) is determined as a function of the r.p.m. (N) by the constant time (t) so that it is increased in proportion to the rise in the r.p.m. from the zero to (N₁). As a result, the ignition timing is angularly retarded in accordance with the rise in the r.p.m. from the zero to (N₁). Thus, within the range in which the r.p.m. is higher than the zero but lower than (N₁), the angular retardation takes place with the predetermined gradient from the crank position (T₁) at which the angular signal (a) is generated to the (M) position. That retardation angle (α) is gradually increased to the value 2π in proportion to the r.p.m. When the r.p.m. reaches (N₁), the position, at which the output voltage (D) of the ope-amp 17 in the charging process of the condenser 16 reaches the power source voltage (Vcc), becomes the next crank position (T₁) so that the saturation of the output voltage (D) is eliminated.

Figure 20:
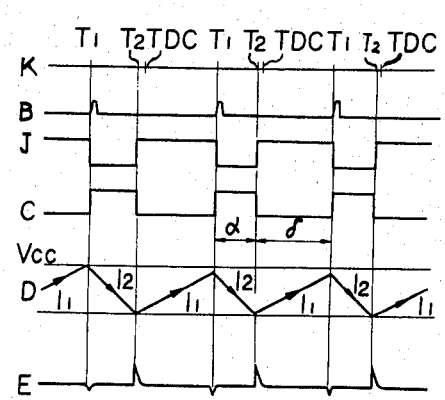

The operatitons in case the r.p.m. of the engine is more than (N₁) will be described with reference to FIG. 20. When the r.p.m. ascends to (N₁), the timing at which the ascending output voltage (D) of the ope-amp 17 reaches the power source voltage (Vcc) becomes coincident with the next crank position (T₁) at which the angular signal (a) is generated. As a result, the output voltage (D) will descend simultaneously as it reaches the power source voltage (Vcc). When the r.p.m. further ascends to a higher level than (N₁), the output voltage (D) of the ope-amp 17 cannot exceed the power source voltage (Vcc) so that the saturation is eliminated. As a result, since the condenser 16 repeats its charging and discharging operations in the constant charge and discharge currents (I₁) and (I₂) irrespective of the r.p.m. of the engine, the output voltage (D) of the ope-amp 17 repeats, as indicated at (D) in FIG. 20, such operations as to descend with the constant gradient from the crank position (T₁), to ascend again with the constant gradient, when it reaches the voltage at the (+) terminal of the comparator 18, and to descend again with the constant gradient at the next crank position (T₂). Thus, since the charge and discharge currents (I₁) and (I₂) of the condenser (16) are constant, the gradient of the output voltage (D) of the ope-amp 17 becomes constant, and the ratio of the retardation angle (α) occupied in one revolution relative to the angle between each of the adjacent crank positions (T₁), as indicated at (D) in FIG. 20, becomes constant. For the r.p.m. higher than (N₁), consequently, the output voltage (D) descends so that the timing, at which the output voltage (D) having descended reaches the voltage at the (+) terminal of the comparator 18, becomes constant at the crank position (T₂) independently of the r.p.m. At this crank position (T₂), the trigger voltage (I) is established so that the constant ignition timing shown in FIG. 21 can be attained.

As has been described in detail hereinbefore, according to the embodiment of the present invention, the angular signal (a), which synchronizes with the r.p.m. of the engine and which corresponds to the maximum advance angle position (T₁), is used so that the charge and discharge voltages of the condenser 16 which is made operative to repeat its discharging and charging operations in the constant charge and discharge currents (I₂) and (I₁), i.e., the discharge and charge outputs of the output voltage (D) of the ope-amp 17 are attained with respect to the angular signal (a), so that the discharge output 51 is reversed to the charge output 52, when it reaches the voltage at the (+) terminal of the comparator 18, whereby the angular ratio of the discharge output occupied in one revolution becomes constant because the charge and discharge currents of that condenser 16 are constant, and so that the retardation angle (α) until the discharge output 51 reaches the voltage at the (+) terminal of the comparator 18 becomes constant with reference to that angular signal (a), whereby the ignition timing at which the position (T₂) retarded from the maximum advance angle position (T₁) becomes the maximum retardation angle position, i.e., constant can be attained. Within the range in which the r.p.m. is lower than (N₁), since the power source voltage (Vcc) and the voltage at the (+) terminal of the comparator 18 are finite whereas the time period of the discharge output 51 is fixed, the timing at which the discharge output 51 reaches the voltage at the (+) terminal of the comparator 18 is retarded in accordance with the rise in the r.p.m. and angularly with the constant gradient from the crank position (T₁) to the maximum retardation angle position (T₂) so that the ignition timing characteristics shown in FIG. 21 can be attained.

Incidentally, the present invention should not be limited to the embodiments thus far described but can contain a variety of embodying modes.

Figure 22:
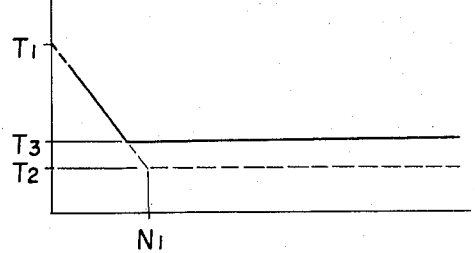
FIG. 22 is a characteristic curve of a further ignition timing.

For example, another signal coil, which is operative to generate the angular signal at any crank position (T₃) between the maximum advance angle position (T₁) and the maximum retardation angle position (T₂) is provided so that this angular signal is used as the trigger signal to render the thyristor 7 conductive thereby to make it possible to attain the ignition timing characteristics shown in FIG. 22.

As has been described hereinbefore, according to the present invention, the first angular signal to be generated at the first crank position and the second angular signal to be generated at the second crank position which is retarded from the first-named crank position are used to determine the maximum advance timing and the maximum retardation timing from the first- and second-named angular signals, respectivley, so that the ratio of the angle, at which such a discharge output of the triangular wave of the integrator made operative to repeat its charging and discharging operatitons in the constant current as intervenes between the second-named crank positions reaches the first predetermined value from the second-named crank position, is made constant relative to the second-named angular signal thereby to preset the constant angle ($\alpha$) and so that the time period, for which such a chafge output of the trangular wave of said integrator as intervenes between the second-named crank positions reaches the second predetermined value, is made constant relative to the second-named angular signal thereby to preset the constant time period (t), whereby the timing, at which said charge output reaches the second predetermined value, is retarded because of said constant time period (t) in accordance with the rise in the r.p.m. of the engine so that the ignition timing, which is angularly retarded with the constant gradient from the first-named crank position to the second-named crank position in accordance with the rise in the r.p.m. of the engine, can be attained.

What is claimed is:

1. An ignition timing control system for an internal combustion engine comprising:
   angular signal generating means for generating first and second angular signals in synchronism with the revolutions of the engine at respective first and second crank positions which said seciond crank position is retarded from said first crank position;
   integrator means whose input is connected to said generating means for receiving said second angular signal and for initiating the discharge mode of said integrator with a constant current and wherein when the output of said integrator in said discharging mode reaches a first predetermined value said integrator operates in a charging mode with a constant current in order to generate alternate charge and discharge outputs to form a triangular wave form output;
   first circuit means for generating an output when said charge output reaches a second predetermined value;
   second circuit means connected to the output of said generating means for receiving said first and second angular signals wherein said second circuit means generates an output between said first and second crank positions;
   logic means whose input is connected to the output of said first and second circuit means respectively and whose output provides an ignition timing signal.

2. An ignition timing control system as set forth in claim 1, wherein said integrator includes an operational amplifier, a condenser connected between the reversed input terminal and output terminal of said operational amplifier, and a resistor connected with the charging and discharging circuit of said condenser, said condneser being made to receptive of the second-named angular signal for starting its discharging operation in a constant current through said resistor and for being charged in a constant current through said resistor when the first-named predetermined value is reached.

3. An ignition timing control system as set forth in claim 1 or 2, wherein the first-named circuit means includes a voltage comparator having its non-reversed input terminal fed with the charge and discharge outputs of said integrator and its reversed input terminal fed with a reference voltage at the second-named predetermined value for generating an output during a time period for which said charge output exceeds said reference voltage.

4. An ignition timing control system as set forth in any of claims 1, 2 or 3, wherein said second-named circuit means includes a thyristor and a transistor having their anodes and collectors connected, said thyristor being adapted to be conductive in response to the first-named angular signal, said transistor being adapted to be conductive in response to the second-named angular signal.

5. An ignition timing control system as set forth in claim 4, wherein said thyristor maintains its inconductive condition whereas only said transistor is rendered conductive when the r.p.m. of the engine is low.

6. An ignition timing control system as set forth in claim 1, wherein said angular signal generating means includes signal coils mounted on a magnetic generator which is driven by the engine.

7. An ignition timing control system for an internal combustion engine comprising:
   angular signal generating means synchronous with the revolutions of the engine for generating first and second angular signals at a respective first predetermined crank position and a second crank position different from said first crank position;
   integrator means connected to the output of said generating means for receiving said second angular signal whereby said integrator operates in a discharging mode with a constant current and whereby when the output of said integrator in a discharging mode reaches a first predetermined value said integrator operates in a charging mode in order to generate charge and discharge outputs so that a triangular wave is output from said integrator means;
   circuit means for generating a trigger output when the output of said integrator in said charge mode reaches a second predetermined value; and
   retarding means for delaying the time at which said integrator output in a charge mode reaches said second predetermined value until said first crank position in accordance with the rise in the rpm of the engine so that an ignition timing signal is produced from one of the trigger output delayed as a result of said retarding means and said second angular signal.

8. An ignition timing control system as set forth in claim 7, wherein the angular signal generating means includes a unitary signal coil for generating alternating positive and negative outputs having their full waves rectified.

* * * * *